United States Patent
Patel et al.

(10) Patent No.: US 6,379,092 B1
(45) Date of Patent: Apr. 30, 2002

(54) HIGH PERFORMANCE SEALING FASTENER

(75) Inventors: Kanubhai Manibhai Patel, Elk Grove Village; Michael Walter Smith, Lake Zurich, both of IL (US); Edward John Smith, Bonita Springs, FL (US)

(73) Assignee: WTPA, Incorporated, Newark, DE (US)

( * ) Notice: Subject to any disclaimer, the term of this patent is extended or adjusted under 35 U.S.C. 154(b) by 0 days.

(21) Appl. No.: 09/561,505

(22) Filed: Apr. 28, 2000

Related U.S. Application Data

(60) Provisional application No. 60/170,112, filed on Dec. 10, 1999.

(51) Int. Cl.[7] .............................. F16B 13/06; F16B 37/04
(52) U.S. Cl. ..................... 411/61; 411/60.2; 411/183; 411/258; 411/542
(58) Field of Search ............................. 411/55, 60.2, 61, 411/182, 183, 258, 542, 544, 30

(56) References Cited

U.S. PATENT DOCUMENTS

| | | | |
|---|---|---|---|
| 4,245,652 A | 1/1981 | Kelly et al. ................. 128/736 |
| 4,500,238 A | 2/1985 | Vassiliou ..................... 411/30 |
| 4,792,475 A | 12/1988 | Bien ........................... 428/137 |
| 4,874,277 A | 10/1989 | Nowak et al. ................. 411/61 |
| 5,100,273 A | 3/1992 | Vassiliou ..................... 411/60 |
| 5,141,375 A | * 8/1992 | Pollizzi ..................... 411/542 X |
| 5,314,280 A | 5/1994 | Gagliardi et al. ........... 411/182 |
| 5,725,343 A | * 3/1998 | Smith ........................ 411/61 X |

OTHER PUBLICATIONS

Attachment 1 shows an item which was being sold before the date (Dec. 10, 1999) that the provisional application 60/170,112 was filed. The present application claims priority of the provisional application 60/170,112.

* cited by examiner

Primary Examiner—Neill Wilson
(74) Attorney, Agent, or Firm—E. Vassiliou

(57) ABSTRACT

A sealing fastener, which expands by the insertion of preferably a screw. The fastener comprises a substantially flat head and two expandable legs. The fastener has further an elastic body, especially a thermoplastic elastomer, molded at least on the lower side of the head by insert injection molding. The elastic body does not contain plasticizers which may be harmful to other plastics (such as polycarbonate and ABS for example) coming in contact with the fastener, all its surfaces are well defined, has well defined properties, and its dimensions are characterized by narrow tolerances.

30 Claims, 3 Drawing Sheets

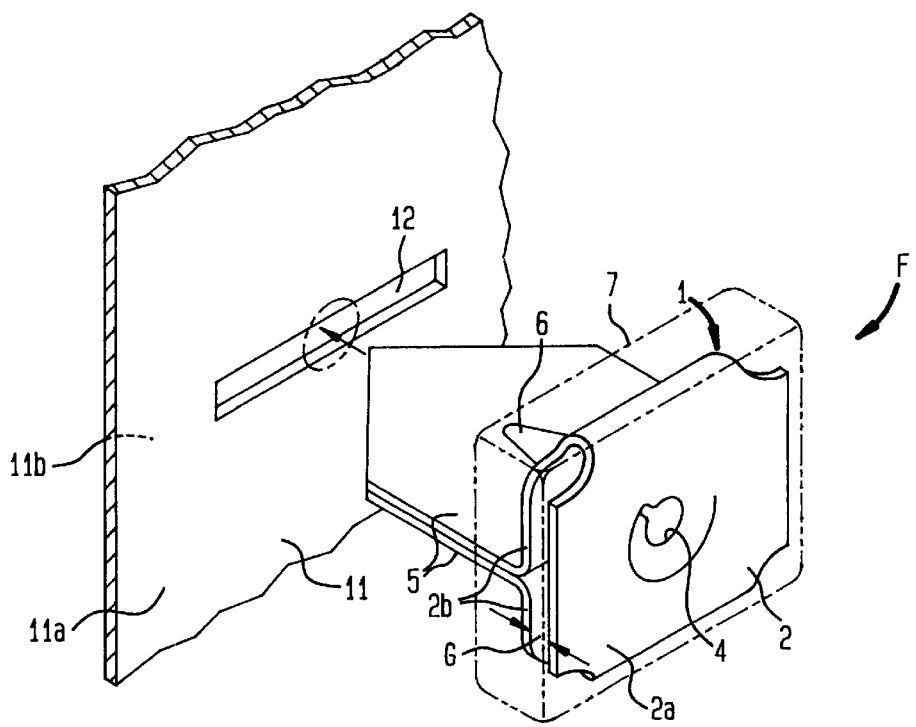
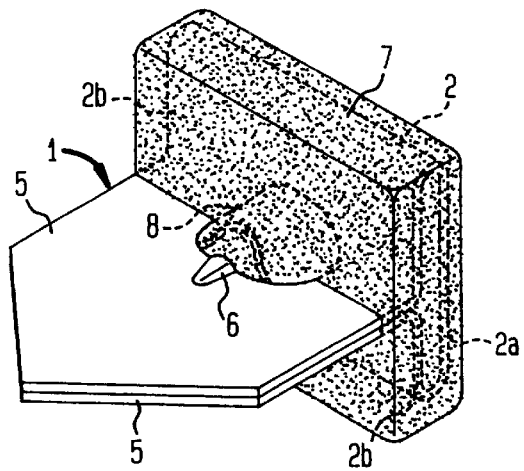
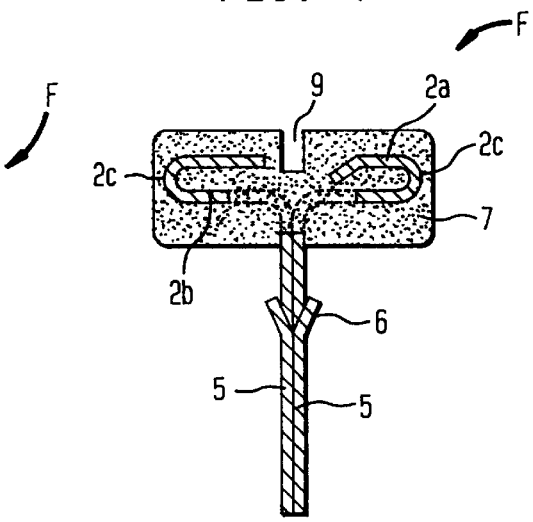

HIGH PERFORMANCE SEALING FASTENER

RELATED APPLICATIONS

This application claims priority of provisional patent application 60/170,112, filed on Dec. 10, 1999, which is incorporated herein by reference in its entirety.

FIELD OF THE INVENTION

This invention pertains to fasteners, and more particularly fasteners which attach one object to another in a water-resistant and vibration resistant manner.

BACKGROUND OF THE INVENTION

In the original conventional technology of fasteners employed to securely attach one object to another, such as for example one part to another in the case of an automobile or an appliance, has utilized a nut on one of the two objects, usually welded or glued to the back of said object, and a bolt passing through a hole on the second object in a manner to be engaged by the nut, thereby securing the two objects together.

This arrangement presents many problems, among which, one of the most important is that in the case that one object is hollow, the nut has to be in place at the back of the hollow object before assembling the two objects together. If for any reason the nut is misplaced, and/or if it becomes desirable to introduce a new fastening connection between the two objects, the task of achieving such connection becomes very difficult if not impossible for all practical purposes. In addition, such connections are not water-resistant and water may be easily penetrate the connection point and be transferred from one side of one or both objects to the other side. Further, vibration during the operation of a device, such as an automobile or appliance for example, containing the two objects very often results in loosening of the bolt and in either full disassembling of the objects from each other, or in a vibration noise which is most annoying and often of unacceptable levels.

Other types of fasteners, the so-called "quick nuts" have also been used, which also suffer from being very susceptible to screw loosening, vibration noises, etc.

Fasteners of the type described in U.S. Pat. No. 4,500,238 (Vassiliou) have been utilized to reduce considerably the potential of bolt or screw loosening and vibration. They have also eliminated the problem of having to place one member of the fastener at the back portion of the hollow object. These fasteners are placed through a slot from the front part of the hollow object. The second part of the fastener, being usually a bolt or a screw, supports the second object by forcing the legs of the fastener (as described for example in U.S. Pat. No. 4,500,238) to open or expand, thereby securing the two objects together.

Nevertheless, due to the rather open configuration of such systems, water may pass through the slots described above on the two objects. Further, although vibration noises due to loosening of the screw or bolt have been reduced greatly by the use of these fasteners (since the potential for screw or bolt loosening has been reduced greatly), vibration noises may still exist due to vibrations transferred from one solid to the other through the rigid connection of the two objects.

Single fasteners, having an elastic waterproofing element, but which lack an expanding member, such as a screw or a bolt for example, exist in the market, but they are by nature considerably less sturdy and do not confront the severe difficulty for water resistance, which difficulty is introduced by the presence of the expanding member and by the overwhelming expansion of the legs of the fastener of the instant invention.

Further, fasteners of the type described in U.S. Pat. No. 4,500,238 having an elastic waterproofing element, are disclosed in U.S. Pat. No. 5,725,343. However, these fasteners suffer from miscellaneous disadvantages. The disclosure mentions plastisol and polyurethane compositions of the elastic body, which are molded by necessity in open molds. Plastisols contain plasticizers, which exude with time and may attack plastic parts, such as ABS and polycarbonates for example, that are in contact with. In addition, the tolerances achieved by the molded plastisols are not in many occasions acceptable. Further, the surface at the open end of the mold, in which the plastisol is molded, is not flat due to surface tension phenomena. Polyurethane compositions require cross-linking, and therefore are at least two-component systems, which have to be mixed with high accuracy, requiring cumbersome and expensive equipment. The reject rate is rather high, and if attempts are made to use close molds, the reject rate becomes even higher. In addition, vias and paths of the mold are repeatedly clogged by cross-linked and solidified matter resulting in high maintenance costs. Silicones may also by used for the same purpose. Although silicones do not have the disadvantage of containing harmful plasticizers, they still need cross-linking, which requires a two-component system, and they are processed in open molds resulting in tolerance difficulties in cases where strict dimension specifications are necessary.

There is, therefore, a need for a fastener which presents good and versatile attachment characteristics for securing two objects to each other by means of an expanding member such as a screw or a bolt for example, and which fastener is vibration resistant, presents waterproofing characteristics, can be repeatedly reused, and lacks the above mentioned disadvantages.

SUMMARY OF THE INVENTION

As aforementioned, this invention pertains fasteners which attach one object to another in a waterproof or watertight manner. More particularly, it pertains a fastener comprising:

(a) a substantially flat head portion having an upper side, and a lower side, the upper side having a first hole, the first hole having a first axis, the first axis being substantially perpendicular to the substantially flat head portion;

(b) a neck having an opening and two side neck portions, the neck extending from the lower side of the substantially flat head portion at a substantially right angle with respect to the substantially flat head portion;

(c) two substantially flat legs extending from the neck, each leg having an inner surface, the two inner surfaces of the two legs being at an initial proximity with each other, the legs being expandable in opposite directions upon inserting through and engaging to the first hole an expansion member;

(d) a funnel configuration at a leg region where the legs start extending from the neck, the funnel configuration being substantially co-axial with the first engageable hole; and (e) an elastic body integrally molded by insert injection molding, at the lower side of the substantially flat head portion.

This invention also pertains a vehicle comprising two parts connected with a fastener, the fastener comprising:

(a) a substantially flat head portion having an upper side, and a lower side, the upper side having a first hole, the first hole having a first axis, the first axis being substantially perpendicular to the substantially flat head portion;
(b) a neck having an opening and two side neck portions, the neck extending from the lower side of the substantially flat head portion at a substantially right angle with respect to the substantially flat head portion;
(c) two substantially flat legs extending from the neck, each leg having an inner surface, the two inner surfaces of the two legs being at an initial proximity with each other, the legs being expandable in opposite directions upon inserting through and engaging to the first hole an expansion member;
(d) a funnel configuration at a leg region where the legs start extending from the neck, the funnel configuration being substantially co-axial with the first engageable hole; and
(e) an elastic body integrally molded by insert injection molding, at the lower side of the substantially flat head portion.

Of course, the elastic body may be extended beyond the lower side, since the limitation of the elastic body being molded at the lower side does not exclude its presence to any other place. Thus, the expressions "at the lower side" and "at least at the lower side" are equivalent. This is also clearly shown in all Figures.

Insert injection molding provides excellent dimension tolerances.

Further, the elastic body may preferably comprise a thermoplastic elastomer. The thermoplastic elastomer may comprise a vulcanized elastomer intimately and uniformly dispersed as a discrete particulate phase within a continuous phase of a thermoplastic polymer.

The vulcanized elastomer may be formed and vulcanized while dispersing a precursor vulcanizable composition into the thermoplastic polymer.

The thermoplastic elastomer may further comprise a compatibilizer, the compatibilizer being a multi-functional compound having at least one segment which is compatible with the thermoplastic polymer and incompatible with the vulcanized elastomer, and at least one segment which is incompatible with the thermoplastic polymer and compatible with the vulcanized elastomer.

It is important that the elastic body has a Shore hardness in the range of A 25 to A 55 according to ASTM D 2240, and a compression set at 23° C. for 70 hours of less than 40% according to ASTM D 395, Method B.

The elastic body has preferably an ultimate tensile strength higher than 200 p.s.i. according to ASTM D 412, ultimate elongation higher than 150% according to ASTM D 412, and after aging at 85° C. for 1008 hours according to ASTM D 573-88 and SAE J2236 (June 92), the ultimate tensile strength remains higher than 100 p.s.i., and the ultimate elongation remains higher than 75%.

ASTM and SAE are very well known to the art standard test methods. ASTM stands for American Society for Testing and Materials, while SAE stands for Society of American Engineers.

BRIEF DESCRIPTION OF THE DRAWING

The reader's understanding of this invention will be enhanced by reference to the following detailed description taken in combination with the drawing figures, wherein:

FIG. 2A illustrates a perspective view of the fastener of the of FIG. 1, and an object having a slot commensurate to the dimensions of the legs of the fastener.

FIG. 2B illustrates a perspective view of the fastener of FIG. 1, with the elastic body extending about halfway down the neck portion and covering the opening of the neck.

FIG. 4 illustrates schematically the cross section of a fastener according to another preferred embodiment of the instant invention illustrated wherein the elastic body extends from over the upper side of the substantially flat heat portion to about halfway down the neck portion.

DETAILED DESCRIPTION OF THE INVENTION

Figure 1A:
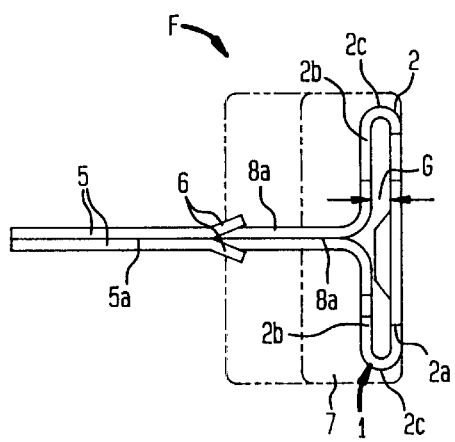
FIG. 1A illustrates schematically a side view of a fastener according to a preferred embodiment of the instant invention with an elastic body extending either about halfway down the neck portion or down to the funnel region.
Figure 1B:
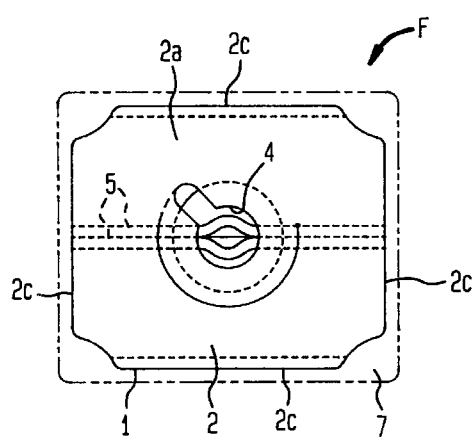
FIG. 1B illustrates schematically the top view of the fastener according to the preferred embodiment of the instant invention illustrated in FIG. 1A with an elastic body extending about halfway down the neck portion.

As aforementioned, this invention pertains to expanding fasteners which can secure two or more objects in a substantially water-tight mode.

Referring now to FIGS. 1A to 1D, there is depicted a sealing fastener F, which comprises a fastener 1, similar to the fasteners described in U.S. Pat. No. 4,500,238, having a substantially flat head portion 2. The substantially flat head portion 2 has an upper side 2a, a lower side 2b, and a perimeter 2c. The upper side 2a has a hole, which hole has a first diameter 4a (FIG. 1D) and a first axis X—X. The first axis X—X is substantially perpendicular to the substantially flat head portion 2.

The upper side 2a and the lower side 2b are separated by a gap G as better shown in FIG. 1A.

Figure 1C:
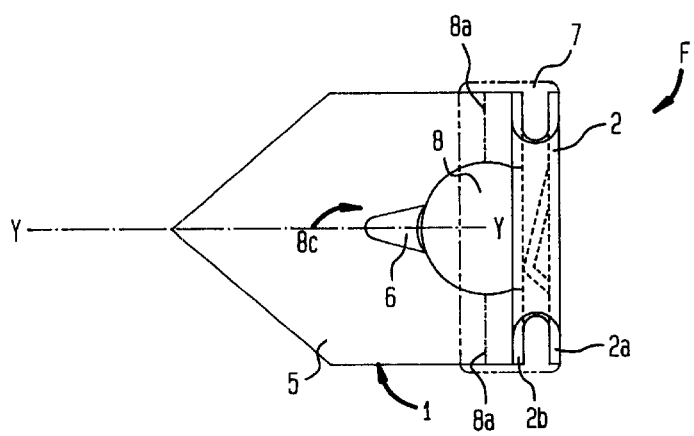
FIG. 1C illustrates schematically the front view of the fastener according to the preferred embodiment of the instant invention illustrated in FIG. 1A with an elastic body extending about halfway down the neck portion.
Figure 1D:
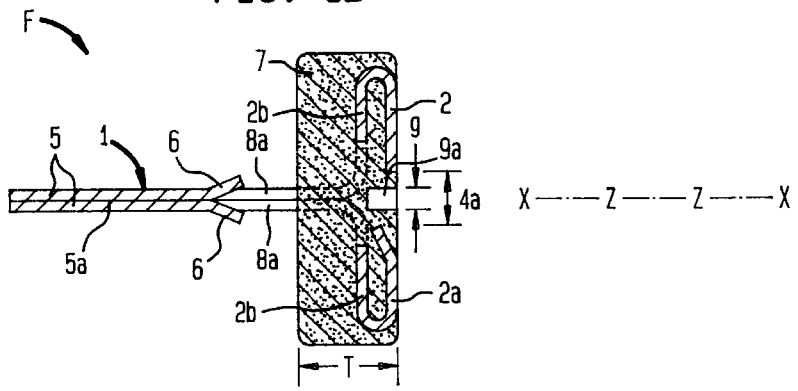
FIG. 1D illustrates schematically a cross section of the side view of the fastener according to the preferred embodiment of the instant invention illustrated in FIG. 1A with an elastic body extending about halfway down the neck portion.

The fastener 1 further comprises a neck 8c having a cutting or opening 8 and two flat neck portions 8a. The neck 8c extends from the lower side 2b of the substantially flat head portion 2 at a substantially right angle with respect to the substantially flat head portion 2 of the fastener 1. The cutting or opening 8 may have any appropriate dimensions. For example, it may have a general round shape as shown in FIG. 1C, or it may be elongated, or it may be just a thin slit parallel to the plane of and adjacent to the substantially flat head portion 2. In the case that it is just a thin slit adjacent to the substantially flat head portion 2, the funnel 6 will also be adjacent to the substantially flat head portion 2, and the two flat neck portions 8a will be minuscule in length from the lower side 2b to the beginning of the legs in the vicinity of the funnel 6.

Two substantially flat legs 5 extend from the neck 8c. Each leg has an inner surface 5a. the two surfaces 5a are at an initial substantial contact with each other. The legs are adapted to expand upon is insertion through the hole of an expanding member, such as a screw, bolt, nail and the like, for example.

There is also a funnel configuration 6 at the leg region where the legs start extending from the neck at the bottom of the cutting or opening 8. The funnel has a second axis Y—Y, substantially coinciding with the first axis X—X.

An elastic body 7, as described in detail hereinbelow, is integrally molded at least at the lower side 2b of the substantially flat head portion 2 of the fastener 1. If the elastic body is molded only at the lower side 2b, a certain amount of waterproofing is achieved. However, when the elastic body is also molded within the gap G, an unexpectedly high improvement in waterproofing occurs as compared to the degree of waterproofing obtained by molding the elastic body only at the lower side 2b.

Measurable improvements also occur when the elastic body is molded around the perimeter 2c and over the upper side 2a, as well as when it covers the opening 8 and extends at least partially over the funnel 6, as better illustrated in FIG. 2B.

As discussed earlier, the gap is preferably larger than 0.1 mm, more preferably between 0.2 and 5 mm, and even more preferably in the range of 0.5 and 2 mm. If the gap is smaller than 0.1 mm, the elastic body finds difficulty in passing through said small gap and fill it during the molding operation. In addition, the waterproofing is inferior. If it is larger than 5 mm the fastener has increased dimensions without considerable benefit, and it becomes cumbersome.

Figure 3A:
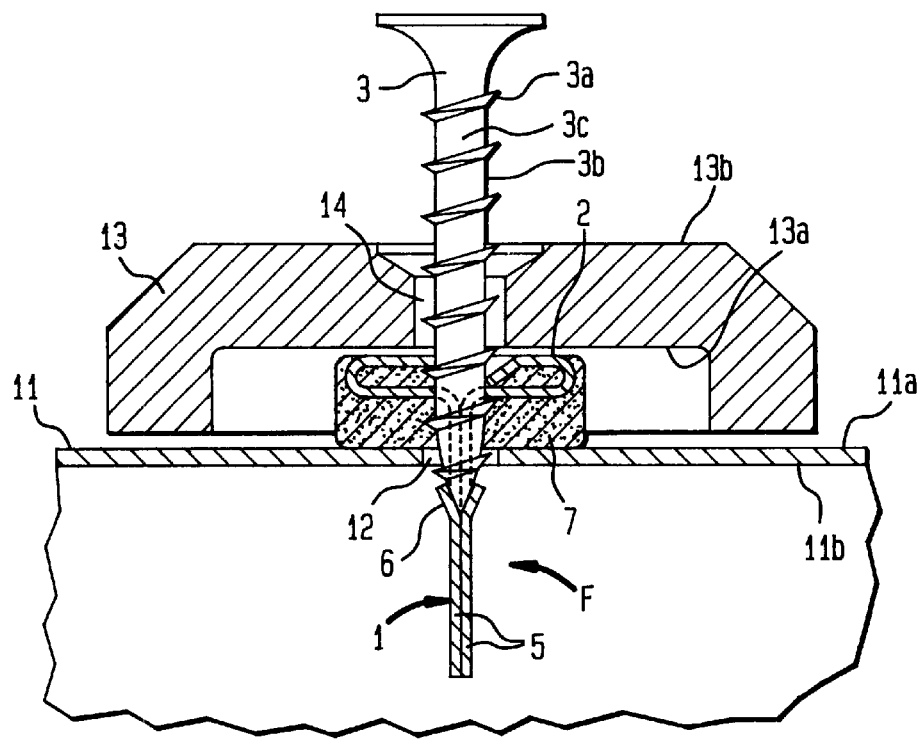
FIG. 3A illustrates schematically an assembly of 2 objects with a fastener of the instant invention and a screw which has been inserted just through the hole.

FIG. 2A is a perspective view of the sealing fastener F before its insertion into a slot 12 of a first object 11, which object 11 has a a front surface 11a and a back surface 11b. FIG. 3A shows a cross section of the first object 11, which may be for example a sheet of metal or plastic, with the fastener 1 inserted into the slot 12, and a second object 13 ready to be attached to the first object 11. The object 13 has two surfaces 13a and 13b. There is also depicted an expanding member, such as screw 3 for example, which has such dimensions as to be adapted to pass through hole 14 of the second object 13. The screw 3 has a thread 3a and a root 3b, which root 3b has a second diameter 3c.

The molding 7 has a thickness T (FIG. 1 D), and preferably a depression or guiding hole 9. The depression or guiding hole 9 has a third diameter 9a which is preferably smaller than the second diameter 3c (diameter of the root 3b of screw 3). The depression or guiding hole 9 may extend partially or totally along the thickness T of the elastic body. If the depression 9 has a varying diameter through the thickness T, then the third diameter 9a is the smallest of the varying diameters. The depression 9 has also a third axis Z—Z which substantially coincides with the first axis X—X and the second axis Y—Y.

Figure 3B:
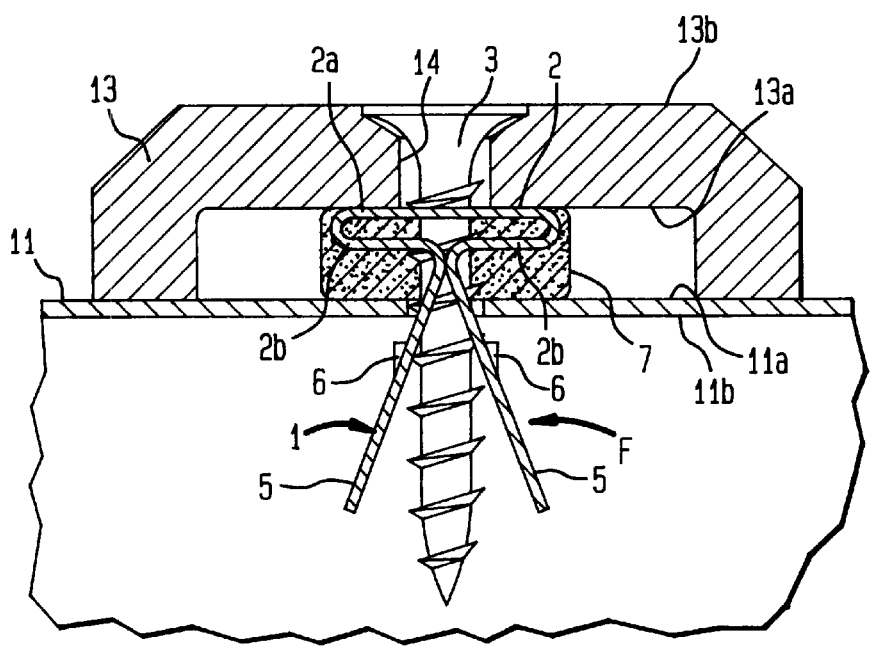
FIG. 3B illustrates schematically an assembly of the two objects of FIG. 1 with the screw having been inserted completely through the fastener in a manner to expand the legs and to connect the two objects in a substantially water tight manner.

FIG. 3B shows the two objects, first object 11 and second object 13, connected together after the screw 3 has been inserted completely into the sealing fastener F and the legs 5 of said fastener have been expanded.

FIG. 4 shows a cross section of sealing fastener F according to the instant invention, wherein the elastic body 7 has been molded all the way around and within the substantially flat head portion 2 of fastener 1.

As aforementioned, the currently known art has disclosed elastic body structures which are, according to the current art, preferably foamed and/or selected from a group comprising plastisol, polyurethane, and a mixture thereof.

In contrast, it has been discovered by the inventors of the instant invention that plastisols and polyurethanes present multiple disadvantages and that elastomers, especially thermoplastic elastomers, which can be molded by insert injection molding, are immensely superior to foamed or unfoamed plastisols and polyurethanes.

As aforementioned, fasteners (as disclosed for example in U.S. Pat. No. 5,725,343) suffer from miscellaneous disadvantages due to the nature of the elastic body. The disclosure in U.S. Pat. No. 5,725,343 mentions plastisol and polyurethane compositions of the elastic body, which are molded by necessity in open molds. Plastisols contain plasticizers, which exude with time and may attack plastic parts that are in contact with. In addition, the tolerances achieved by the molded plastisols are not in many occasions acceptable. Further, the surface at the open end of the mold, in which the plastisol is molded, is not flat due to surface tension phenomena. Polyurethane compositions require cross-linking, and therefore are at least two-component systems, which have to be mixed with high accuracy, requiring cumbersome and expensive equipment. The reject rate is rather high, and if attempts are made to use close molds, the reject rate becomes even higher. In addition, vias and paths of the mold are repeatedly clogged by cross-linked and solidified matter resulting in high maintenance costs. Thus, similarly as in the case of plastisols, the tolerances achieved by the molded polyurethanes are not in many occasions acceptable, increasing considerably the reject rate.

In contrast, elastomers, especially thermoplastic elastomers, which are suitable for molding by insert injection molding techniques, well known to the art, do not contain harmful plasticizers, can be molded with outstanding dimensional accuracy, which guarantees extremely narrow tolerances, and further, any surplus, or defective, or cut-off material, or scrap, or flashing, etc., is re-moldable.

Examples of thermoplastic elastomers, including components of such elastomers, and methods of making, among other information, are described in U.S. Pat. Nos. 6,020,431, 6,020,427, 6,05,052, 5,952,425; 5,942,577; 5,939,464; 5,936,028; 5,910,543; 5,852,118; 5,843,577; 5,779,968; 5,777,033; 5,777,029; 5,750,625; 5,672,660; 5,621,045; 5,609,962; 5,591,798; 5,589,544; RE35,398; 5,574,105; 5,523,350; 5,403,892; 5,397,839; 5,397,832; 5,349,005; 5,300,573; 5,290,886; 5,180,777; 5,177,147; 5157,081; 5,100,947; 5,086,121; 5,081,179; 5,073,597; 5,070,111; 5,051,478; 5,051,477; 5,028,662, 5.008,337; 5,003,003; 4,808,665; 4,777,211; 4,654,402; 4,555,552; 4,555,546; 4,473,683; 4,419,499; 4,409,365; 4,380,606; 4,374,956; 4,358,553; 4,355,139; 4,350,740; 4,348,502; 4,348,501; 4,348,266; 4,338,413; 4,338,4114,327,199; 4323,625; 4,320,173; 4,310,638; 4,299,931; 4,297,453; 4,288,570; 4,287,324; 4,278,572; 4,271,049; 4,226,953; 4,207,404; 4,203,884; 4,197,379; 4,183,876; 4,173,556; 4,141,878; and 4,141,863; all of which patents are incorporated herein by reference.

In general, thermoplastic elastomers are blends of polymers that can be processed and recycled in the same way as thermoplastic (but not elastomeric) matter, which blends, however, have properties and performance similar to that of vulcanized rubber at service temperatures. The thermoplastic elastomers are preferably obtained by mixing a thermoplastic polymer with an elastomeric composition in a way that the elastomeric composition is intimately and uniformly dispersed as a discrete particulate phase within the continuous phase of the thermoplastic polymer.

The elastomeric composition may comprise an elastomer which is vulcanized during being dispersed within a second thermoplastic polymer (dynamic vulcanization). The mixing and dispersing takes place preferably at elevated temperatures and under high shear conditions (see for example U.S. Pat. No. 5,574,105).

The thermoplastic elastomer preferably comprises a compatibilizer, the compatibilizer being a multi-functional compound having at least one segment which is compatible with the thermoplastic polymer and incompatible with the vulcanized elastomer, and at least one segment which is incompatible with the thermoplastic polymer and compatible with the vulcanized elastomer.

It is of particular importance that the elastic body has a Shore hardness in the range of A 25 to A 55, and preferably in the range of A 35 to A 45, according to ASTM D 2240. If the Shore hardness is less than A 25, the elastic body is excessively malleable, and it may tear too easily, while if the Shore hardness is higher than A 55, the elastic body is not adequately malleable for sealing purposes. Also, outside the range of A 25 to A 55, an expansion member, such as a screw for example, will produce permanent damage in the thread region, especially after repeated use.

It is also of particular importance that the elastic body has a compression set at 23° C. for 70 hours of less than 40%, and preferably less than 30% according to ASTM D 395, Method B. If the compression set is more than 40% under the above conditions, the sealing performance of the elastic body will deteriorate considerably during use, and especially under repeated use. Also, if the compression set under these conditions is higher than 40%, an expansion member, such as a screw for example, will produce permanent damage in the thread region, especially after repeated use.

It is also important that the elastic body has a ultimate tensile strength higher than 200 p.s.i. (ASTM D 412), and ultimate elongation higher than 150% (ASTM D 412), for similar reasons as above.

Examples of commercial thermoplastic elastomers complying to the above ASTM requirements are SANTOPRENE® 111-35 from Advanced Elastomer Systems, Akron, Ohio, MULTIFLEX® 40005 and MULTIFLEX® 30005 from Multibase, Inc., Copley, Ohio, DYNAFLEX® 2706 and DYNAFLEX® 6730 from GLS Corporation, McHenry, Ill., TEKNOR® 5000-NT-40 NT and TEKNOR® 9000-NT-25 NT from Teknor Apex Company, Pawtucket, R.I. 02861.

Of particular interest is SANTOPRENE® 111-35, which in addition to the above requirements, is also considerably superior to the other products with respect to high temperature performance.

For applications where the fastener is used in hot areas, it is important that after aging at 85° C. for 1008 hours according to ASTM D 573-88 and SAE J2236 (June 92), the ultimate tensile strength remains higher than 100 p.s.i., and the ultimate elongation remains higher than 75%.

In operation, the fastener F (see FIG. 2A) is inserted into the slot 12 of the first object 11. In sequence, the second object 13 (see FIG. 3A) is positioned on top of the first object 11 in a manner that the hole 14 of the second object 13 is aligned with the hole 4 of fastener 1 and/or the depression or guiding hole 9 of the elastic body 7 of the fastener 1. In turn, the screw 3 is inserted through the hole 14 of the second object 13 and forced to penetrate into the elastic body 7, and engage with the preferably commensurate hole 4 of fastener 1. The screw 3 is then threaded or otherwise forced to fully penetrate (see FIG. 3B) the elastic body 7. During its course of being inserted into the fastener F, it meets the funnel 6, and as it proceeds further, it forces the legs 5 to expand and compress the elastic body 7 onto the front surface 11a, thus hermetically sealing the first object 11 onto the second object 13, in a manner that no water can move through the slot 12 and/or portions of the fastener F from the side of the back surface 11b to the side of the front t surface 11a of the first object 11, and vice versa. This type of connection helps also in reducing squeaking noises due to vibrations.

If it is desirable to waterproof the object 13 so that no water may leak through hole 14 from the side of surface 13b to the side of surface 13a or vice versa, the fastener F, better shown in FIG. 4 is more appropriate. At the end of threading the screw 3 on the preferably commensurate hole 4, the surface 13a is forced against the elastic body 7, thereby compressing said elastic body in a waterproof manner.

In both cases, a tight contact between the root and the threads of the screw 3 and the elastic body 7 ensure no leakage through said contact.

The fastener of this invention presents considerably better sealing performance than the fasteners of the current art, such as the one disclosed in U.S. Pat. No. 5,725,343, due to the different manufacturing technique of the fastener and the nature of the elastic body. All surfaces of the elastic body of this invention are molded in a manner to comply to very narrow tolerances for the intended application. Also the lower and upper surfaces, which come in contact with the first object 11 and the second object 13, respectively, are absolutely flat guaranteeing excellent sealing performance. Further, the fasteners of the present invention are far superior to those of the current art, since the elastic body, being a thermoplastic elastomer as defined above, does not affect the second object in case the second object is a plastic panel, such as ABS or polycarbonate. In contrast, when the elastic body is plastisol, the elastic body exudes plasticizers, which deteriorate the plastic panel and cause cracking within a certain period of time.

Examples demonstrating the operation of the instant invention have been given for illustration purposes only, and should not be construed as limiting the scope of this invention in any way. In addition it should be stressed that the preferred embodiments discussed in detail hereinabove, as well as any other embodiments encompassed within the limits of the instant invention, may be practiced individually, or in any combination thereof, according to common sense and/or expert opinion. These combinations also lie within the realm of the present invention. Furthermore, any attempted explanations in the discussion are only speculative and are not intended to narrow the limits of this invention.

What is claimed is:

1. A fastener comprising:
   (a) a substantially flat head portion having an upper side, and a lower side, the upper side having a first hole, the first hole having a first axis, the first axis being substantially perpendicular to the substantially flat head portion;
   (b) a neck having an opening and two side neck portions, the neck extending from the lower side of the substantially flat head portion at a substantially right angle with respect to the substantially flat head portion;
   (c) two substantially flat legs extending from the neck, each leg having an inner surface, the two inner surfaces of the two legs being at an initial proximity with each other, the legs being expandable in opposite directions upon inserting through and engaging to the first hole an expansion member;

(d) a funnel configuration at a leg region where the legs start extending from the neck, the funnel configuration being substantially co-axial with the first engageable hole; and (e) an elastic body integrally molded by insert injection molding, at the lower side of the substantially flat head portion.

2. A fastener as defined in claim 1, wherein the elastic body comprises a thermoplastic elastomer.

3. A fastener as defined in claim 2, wherein the thermoplastic elastomer comprises a vulcanized elastomer intimately and uniformly dispersed as a discrete particulate phase within a continuous phase of a thermoplastic polymer.

4. A fastener as defined in claim 3, further comprising a compatibilizer, the compatibilizer being a multi-functional compound having at least one segment which is compatible with the thermoplastic polymer and incompatible with the vulcanized elastomer, and at least one segment which is incompatible with the thermoplastic polymer and compatible with the vulcanized elastomer.

5. A fastener as defined in claim 3, wherein the vulcanized elastomer has been formed and vulcanized while dispersing a precursor vulcanizable composition into the thermoplastic polymer.

6. A fastener as defined in claim 5, further comprising a compatibilizer, the compatibilizer being a multi-functional compound having at least one segment which is compatible with the thermoplastic polymer and incompatible with the precursor vulcanizable composition and vulcanized elastomer, while also having at least one segment which is incompatible with the thermoplastic polymer and compatible with the precursor vulcanizable composition and the vulcanized elastomer.

7. A fastener as defined in claim 1, wherein the elastic body has a Shore hardness in the range of A 25 to A 55 according to ASTM D 2240, and a compression set at 23° C. for 70 hours of less than 40% according to ASTM D 395, Method B.

8. A fastener as defined in claim 2, wherein the elastic body has a Shore hardness in the range of A 25 to A 55 according to ASTM D 2240, and a compression set at 23° C. for 70 hours of less than 40% according to ASTM D 395, Method B.

9. A fastener as defined in claim 3, wherein the elastic body has a Shore hardness in the range of A 25 to A 55 according to ASTM D 2240, and a compression set at 23° C. for 70 hours of less than 40% according to ASTM D 395, Method B.

10. A fastener as defined in claim 4, wherein the elastic body has a Shore hardness in the range of A 25 to A 55 according to ASTM D 2240, and a compression set at 23° C. for 70 hours of less than 40% according to ASTM D 395, Method B.

11. A fastener as defined in claim 5, wherein the elastic body has a Shore hardness in the range of A 20 to A 55 according to ASTM D 2240, and a compression set at 23° C. for 70 hours of less than 40% according to ASTM D 395, Method B.

12. A fastener as defined in claim 6, wherein the elastic body has a Shore hardness in the range of A 25 to A 55 according to ASTM D 2240, and a compression set at 23° C. for 70 hours of less than 40% according to ASTM D 395, Method B.

13. A fastener as defined in claim 7, wherein the elastic body has an ultimate tensile strength higher than 200 p.s.i. according to ASTM D 412, ultimate elongation higher than 150% according to ASTM D 412, and after aging at 85° C. for 1008 hours according to ASTM D 573-88 and SAE J2236 (June 92), the ultimate tensile strength remains higher than 100 p.s.i., and the ultimate elongation remains higher than 75%.

14. A fastener as defined in claim 8, wherein the elastic body has an ultimate tensile strength higher than 200 p.s.i. according to ASTM D 412, ultimate elongation higher than 150% according to ASTM D 412, and after aging at 85° C. for 1008 hours according to ASTM D 573-88 and SAE J2236 (June 92), the ultimate tensile strength remains higher than 100 p.s.i., and the ultimate elongation remains higher than 75%.

15. A fastener as defined in claim 9, wherein the elastic body has an ultimate tensile strength higher than 200 p.s.i. according to ASTM D 412, ultimate elongation higher than 150% according to ASTM D 412, and after aging at 85° C. for 1008 hours according to ASTM D 573-88 and SAE J2236 (June 92), the ultimate tensile strength remains higher than 100 p.s.i., and the ultimate elongation remains higher than 75%.

16. A fastener as defined in claim 10, wherein the elastic body has an ultimate tensile strength higher than 200 p.s.i. according to ASTM D 412, ultimate elongation higher than 150% according to ASTM D 412, and after aging at 85° C. for 1008 hours according to ASTM D 573-88 and SAE J2236 (June 92), the ultimate tensile strength remains higher than 100 p.s.i., and the ultimate elongation remains higher than 75%.

17. A fastener as defined in claim 11, wherein the elastic body has an ultimate tensile strength higher than 200 p.s.i. according to ASTM D 412, ultimate elongation higher than 150% according to ASTM D 412, and after aging at 85° C. for 1008 hours according to ASTM D 573-88 and SAE J2236 (June 92), the ultimate tensile strength remains higher than 100 p.s.i., and the ultimate elongation remains higher than 75%.

18. A fastener as defined in claim 12, wherein the elastic body has an ultimate tensile strength higher than 200 p.s.i. according to ASTM D 412, ultimate elongation higher than 150% according to ASTM D 412, and after aging at 85° C. for 1008 hours according to ASTM D 573-88 and SAE J2236 (June 92), the ultimate tensile strength remains higher than 100 p.s.i., and the ultimate elongation remains higher than 75%.

19. A vehicle comprising two parts connected with a fastener, the fastener comprising:

(a) a substantially flat head portion having an upper side, and a lower side, the upper side having a first hole, the first hole having a first axis, the first axis being substantially perpendicular to the substantially flat head portion;

(b) a neck having an opening and two side neck portions, the neck extending from the lower side of the substantially flat head portion at a substantially right angle with respect to the substantially flat head portion;

(c) two substantially flat legs extending from the neck, each leg having an inner surface, the two inner surfaces of the two legs being at an initial proximity with each other, the legs being expandable in opposite directions upon inserting through and engaging to the first hole an expansion member;

(d) a funnel configuration at a leg region where the legs start extending from the neck, the funnel configuration being substantially co-axial with the first engageable hole; and (e) an elastic body integrally molded by insert injection molding, at the lower side of the substantially flat head portion.

20. A vehicle as defined in claim 19, wherein the elastic body comprises a thermoplastic elastomer.

21. A vehicle as defined in claim 20, wherein the thermoplastic elastomer comprises a vulcanized elastomer intimately and uniformly dispersed as a discrete particulate phase within a continuous phase of a thermoplastic polymer.

22. A vehicle as defined in claim 21, further comprising a compatibilizer, the compatibilizer being a multi-functional compound having at least one segment which is compatible with the thermoplastic polymer and incompatible with the vulcanized elastomer, and at least one segment which is incompatible with the thermoplastic polymer and compatible with the vulcanized elastomer.

23. A vehicle as defined in claim 21, wherein the vulcanized or cross-linked elastomer has been formed and vulcanized while dispersing a precursor vulcanizable composition into the thermoplastic polymer.

24. A vehicle as defined in claim 23, further comprising a compatibilizer, the compatibilizer being a multi-functional compound having at least one segment which is compatible with the thermoplastic polymer and incompatible with the precursor vulcanizable composition and vulcanized elastomer, while also having at least one segment which is incompatible with the thermoplastic polymer and compatible with the precursor vulcanizable composition and the vulcanized elastomer.

25. A vehicle as defined in claim 19, wherein the elastic body has a Shore hardness in the range of A 25 to A 55 according to ASTM D 2240, and a compression set at 23° C. for 70 hours of less than 40% according to ASTM D 395, Method B.

26. A vehicle as defined in claim 20, wherein the elastic body has a Shore hardness in the range of A 25 to A 55 according to ASTM D 2240, and a compression set at 23° C. for 70 hours of less than 40% according to ASTM D 395, Method B.

27. A vehicle as defined in claim 21, wherein the elastic body has a Shore hardness in the range of A 25 to A 55 according to ASTM D 2240, and a compression set at 23° C. for 70 hours of less than 40% according to ASTM D 395, Method B.

28. A vehicle as defined in claim 22, wherein the elastic body has a Shore hardness in the range of A 25 to A 55 according to ASTM D 2240, and a compression set at 23° C. for 70 hours of less than 40% according to ASTM D 395, Method B.

29. A vehicle as defined in claim 23, wherein the elastic body has a Shore hardness in the range of A 20 to A 55 according to ASTM D 2240, and a compression set at 23° C. for 70 hours of less than 40% according to ASTM D 395, Method B.

30. A vehicle as defined in claim 24, wherein the elastic body has a Shore hardness in the range of A 25 to A 55 according to ASTM D 2240, and a compression set at 23° C. for 70 hours of less than 40% according to ASTM D 395, Method B.

* * * * *